Feb. 4, 1941. J. M. HALL 2,230,943
HEAT EXCHANGE APPARATUS
Filed April 14, 1938
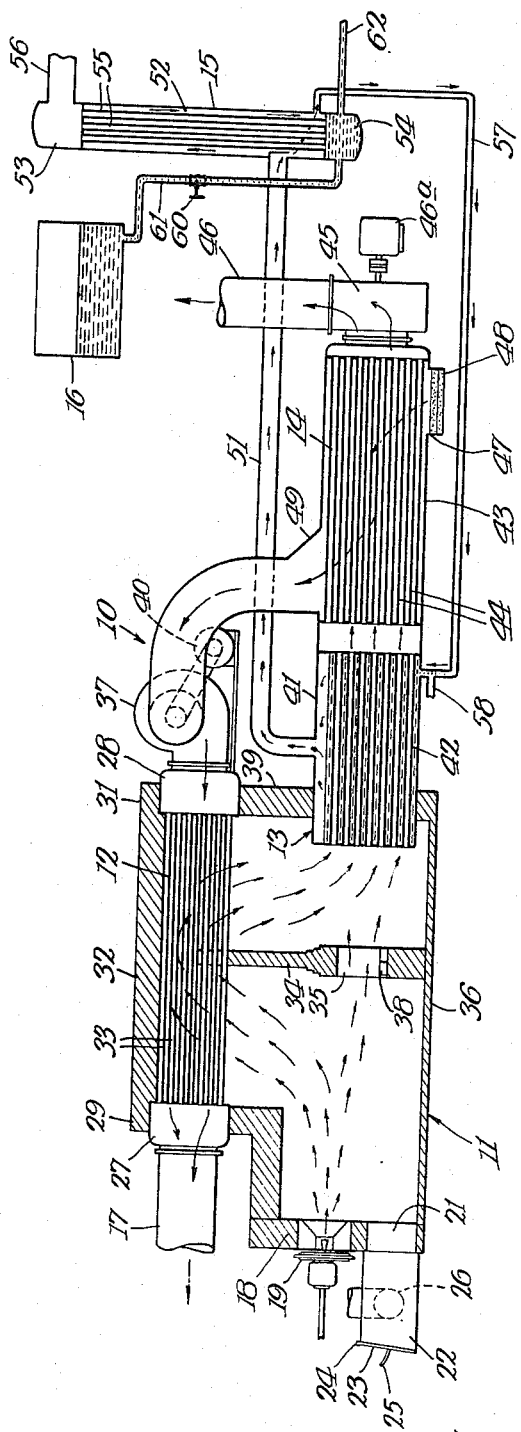
Inventor:
Joseph M. Hall
By Gillson, [illegible]
Attys.

Patented Feb. 4, 1941

2,230,943

UNITED STATES PATENT OFFICE 2,230,943

HEAT EXCHANGE APPARATUS

Joseph M. Hall, Chicago, Ill.

Application April 14, 1938, Serial No. 201,978

6 Claims. (Cl. 126—101)

This invention relates to heat exchange systems, and more particularly to apparatuses for heating gases and liquids utilized in the dehydration of liquid and semi-liquid products, and the like.

One of the objects of the invention is the provision of a new and improved heating apparatus utilizing steam in a closed system for evaporating liquid products.

Another object of the invention is the provision of a new and improved heat exchange device especially adapted for use with steam and air as heating media.

A further object of the invention is the provision of a new and improved heating furnace and apparatus for conveying heating media to and from said furnace for utilizing and reheating the media.

Another object of the invention is the provision of a new and improved heating apparatus for heating air and for generating steam to be used as heat exchanging media, and for utilizing the heat in said media to a maximum extent.

A still further object of the invention is the provision of a new and improved heating apparatus for imparting heat to the heat exchanging media that is simple in construction, easily assembled, efficient in operation, and that is not likely to function improperly or get out of order.

Other and further objects and advantages of the invention will appear from the following description, taken in connection with the accompanying drawing, in which the figure is a side elevation of the apparatus, with parts in section and parts broken away, showing the device more or less diagrammatically.

In the transference of heat it is common practice to employ a heating medium, such as air, vapor, or the like, for delivering the heat where it is desired. In the evaporation and dehydration of milk, for instance, great difficulty has been experienced in utilizing to the fullest extent the heat generated in the heating furnace.

In heat transference the object to be heated will, in many instances, determine the media that is most appropriate to be used. For instance, in dehydrating liquid products, where the air contacts the products, comparatively dry air must be employed, while steam may be used for evaporating or concentrating the products preparatory to dehydration or desiccation.

The present invention seeks to provide an apparatus that simultaneously conditions two heating media, utilizing waste heat from one to preheat the other. The parts of the apparatus are so arranged as to utilize the heat generated in the furnace to the most efficient extent.

While the apparatus disclosed is especially adapted for heating air and a liquid, and employing heated air and steam as the heating media for concentrating and desiccating liquid products, such as milk and the like, it is understood it may be used for other purposes, and that the construction illustrated and described is by way of example only.

In evaporators for use in concentrating milk and other liquid product used as foods or beverages, for instance, it is common practice to thoroughly cleanse the entire system, including the boilers or evaporators, at frequent intervals, usually once each twenty-four hours in milk dehydrator plants. This requires considerable time and expense. The desirability of using a system the apparatus of which is so constructed that there is a minimum of surface to clean, is apparent.

The present invention seeks to provide means requiring a minimum of apparatus for conditioning the media for effecting the heat transference necessary to concentrate the liquid product to the desired consistency before transferring it to the dehydrator, and for its final desiccation.

Referring now to the drawing, the reference character 10 designates the heating system which comprises a furnace 11, having an air heater 12 in its upper portion, a boiler 13, a preheater 14, an evaporator 15, and a reservoir 16 for containing the liquid product that is destined to be dehydrated.

The apparatus is adapted to be used in any relation where heat transference is desired. For the purpose of disclosure, the apparatus is shown as being utilized to concentrate a liquid product, and as delivering heated air through a conduit 17 that may lead to the desiccator or to any desired apparatus at any predetermined location.

In the form of the apparatus selected to illustrate one embodiment of the invention, which is by way of example only, the furnace 11 has a front wall 18, within which is mounted an oil or gas burner 19, of any approved construction. The front wall also has an opening 21, over which is fitted a chamber 22, having its outer end closed by a door or the like, 23, which, when open, affords access to the interior of the furnace. The door 23 is shown as being hinged at its upper edge, as at 24, and suitable means, such as a quadrant 25, is provided for holding the door partly open, if desired. Under ordinary working conditions this door is closed.

The side wall of the chamber 22 is provided with an opening in which is secured the end of a conduit 26, for returning the heated air delivered to the desired apparatus through the conduit 17. When the heated air is employed to dehydrate liquid products, the conduit 26 conveys the air from the air separator to the furnace, thereby supplying heated air for combustion for the burner 19.

The upper portion of the furnace or combustion chamber is provided with the air heater 12, which comprises headers 27, 28, secured in the front wall section 29 and in the rear wall 31 adjacent the top wall 32 of the furnace. Tubes 33 for the passage of air are secured in the partition walls of said headers. A baffle wall 34, having an opening 35, extends from the bottom wall 36 of the fire-box to said tubes for directing the heated gases onto and around the tubes 33 for heating the air passing therethrough. The air is forced through the heater by a fan or blower 37, operated by a motor 40, as will presently appear.

The opening 35 is provided in the baffle wall to permit a portion of the heated gases to pass therethrough. By partially closing the opening 35 by placing fire brick 38 in the same, the desired amount of heated gases may be directed over the wall 34, among the tubes 33. If it is desired that the air shall issue from the heater at a higher temperature, more bricks are placed in the opening 35 for restricting the size thereof.

Extending through the rear end wall 39 of the furnace is the front end of a boiler 13. This boiler is in the form of a receptacle 41, containing water or the like liquid, and having tubes 42 extending therethrough for the passage of the heated gases. All of the heated air flowing over and through the baffle wall 34 passes through the boiler for converting the water therein into steam.

The receptacle has a steam space above the tubes 42 for collecting steam or vapor generated in the boiler. This steam is conducted to the evaporator 15, where it gives up its heat to evaporate the liquid product contained in the evaporator. The steam will impart its heat to the liquid in the evaporator, and hence will be condensed in said evaporator. The condensed steam or liquid will be returned by thermosyphonic action or gravity to the chamber 41, thus completing a cycle.

Attached to or in communication with the tubular boiler is the preheater 14. This heater also comprises a chamber 43, having horizontal passages or tubes 44 passing therethrough and through which the heated air from the boiler passes. A fan or blower 45, operated by a suitable motor 46ª, draws the air through the furnace, boiler and preheater, and discharges it into the atmosphere through the pipe 46 at greatly reduced temperature.

The chamber 43 is provided with an entrance opening 47, having an air filter 48 therein for admitting air to the preheater. The chamber 43 has a discharge passage 49 on its opposite side adjacent one end of the preheater, which conducts air passing through the preheater to the intake of the fan or blower 37, which forces this air through the heater 12 and conduit 17 to the desiccator or other apparatus utilizing the heated air.

Steam generated in the boiler 13 is conducted through a passage 51 to the apparatus utilizing the heat, here shown as a liquid product evaporator 15. The evaporator, a portion only of which is shown, comprises a chamber 52, having a top header 53 for steam, a bottom header 54 for the concentrate, and pipes 55 between the partition walls of the headers. The liquid product to be concentrated is supplied from the reservoir 16, and is contained in the pipes and lower header. The steam from the product collects in the upper header and passes to the condenser or collector through the passage 56.

The steam from the boiler 13 passes through the pipe or passage 51 into the chamber 52 surrounding the tubes 55. The steam gives up sensible and latent heat to the liquid in the tubes for evaporating the same, and this transference of heat condenses the steam which is returned by gravity to the boiler through the pipe 57. A branch pipe 58 is adapted to introduce fresh water into the system when desired.

It will thus be seen that the system for utilizing steam as a heating medium is a closed system using the medium over and over again. The system for utilizing the air is not a closed system because where air is used for absorbing moisture means must be provided for removing the moisture if the air is to be reused. It will be noted that the air is returned after use to be utilized in assisting combustion in the fire-box. Since the air, after passing through the dehydrator, retains a great amount of heat, this use of the heated air conserves the heat to a material extent. Likewise, using the heated gases after they pass through the boiler to preheat the air entering the preheater conserves the heat of these gases to a material extent.

In order to control the level of the liquid product in the evaporator 15, a valve 60 in the supply conduit 61 is provided. A pipe 62 conducts the concentrate collected in the header 54 to the header of the second evaporator, or to the dehydrator, as the case may be.

It is thought from the foregoing, taken in connection with the accompanying drawing, that the construction and operation of my device will be apparent to those skilled in the art, and that changes in size, shape and proportion may be made without departing from the spirit and scope of the appended claims.

I claim as my invention:

1. In a heat exchange apparatus, a furnace, a baffle wall in said furnace, said wall having an opening therethrough, a heater above said baffle, a boiler extending into said furnace opposite said opening, and an exhaust fan for causing a portion of said gases from said furnace to flow over said wall, through said heater and boiler and into the intake of said fan, and other portions of said gases to flow directly from said furnace through said boiler into the intake of said fan.

2. In a heat exchange apparatus, a furnace, a baffle wall in said furnace, said wall having an opening therethrough, a heater above said baffle, a boiler extending into said furnace opposite said opening, and an exhaust fan for causing a portion of said gases from said furnace to flow over said wall, through said heater and boiler and into the intake of said fan, and other portions of said gases to flow directly from said furnace through said boiler into the intake of said fan, and means for varying the amount of gases flowing through said heater without affecting the volume of gases flowing through the boiler.

3. In a dehydrating system, a furnace, an air heater in the upper portion of said furnace, a boiler and a preheater arranged in horizontal alinement with the forward end of said boiler in communication with said furnace, a fan for causing heated gases of combustion to flow first through said air heater, then through said boiler for generating steam, and finally through said preheater, and a fan for causing fresh air to flow first through said preheater and then through said air heater for heating said air for use in dehydrating a liquid product.

4. In a heat exchange device, a furnace, an air heater within said furnace for heating air for dehydrating a liquid product, a boiler, a preheater for preheating said air, means for directing heated gases of combustion from said furnace first through said heater and then through said boiler and preheater in series in the order named, means for conducting air through said preheater and heater, and a conduit connected to said heater for conducting air from the device to a point of use.

5. In a heat exchange system, a furnace, a boiler, an air heater, a preheater, means including a fan at the outer end of said preheater for causing heated gases of combustion from said furnace to flow first through said heater and then through said boiler and preheater in the order named, means for varying the amount of heated gases flowing through said heater without affecting the amount of gases flowing through said boiler and preheater, and a conduit connected to said heater for conducting air from the system to a point of use.

6. In a heat exchange system, a furnace, a boiler, an air heater for heating air for dehydrating a liquid product, a preheater for preheating said air, means for causing heated gases of combustion from said furnace to flow first through said heater, then through said boiler and finally through said preheater, said means comprising a blower arranged posterior to said preheater, means for causing a portion of the heated gases in said furnace to pass directly from said furnace into said boiler for heating the same, and a conduit connected to said heater for conducting air from the system to a point of use.

JOSEPH M. HALL.